United States Patent [19]

Lewis

[11] Patent Number: 4,922,151
[45] Date of Patent: May 1, 1990

[54] ELECTRIC MOTOR MOUNTING ASSEMBLY

[75] Inventor: John G. Lewis, St. Louis, Mo.
[73] Assignee: Emerson Electric Co., St. Louis, Mo.
[21] Appl. No.: 227,162
[22] Filed: Aug. 2, 1988
[51] Int. Cl.$^5$ .......................... H02K 5/26; F16H 7/14
[52] U.S. Cl. ...................... 310/91; 474/114; 474/133
[58] Field of Search ............... 68/23.7, 23.3, 23 R, 68/12 R; 310/91, 51; 248/638; 474/113, 114, 133

[56] References Cited

U.S. PATENT DOCUMENTS

| | | | |
|---|---|---|---|
| 3,848,437 | 11/1974 | Rottering | 68/12 R |
| 4,260,125 | 4/1981 | Levine | 248/675 |
| 4,426,163 | 1/1984 | Schluchter et al. | 310/91 |
| 4,602,176 | 7/1986 | Baker | 310/51 |

Primary Examiner—Patrick R. Salce
Assistant Examiner—Judson H. Jones
Attorney, Agent, or Firm—Polster, Polster and Lucchesi

[57] ABSTRACT

A two point mounting assembly for mounting a dynamoelectric machine or motor in a domestic appliance, for example, a washing machine is disclosed as including a motor having front and rear endshields. The front endshield of the motor, through which a motor shaft extends, has mounting ears integrally formed with it. A mounting plate is provided for the washing machine. The plate has a transmission for transmitting power from the motor to a tub and agitator of the washer. The mounting plate includes a yoke sized to support the motor along an endshield ear and yoke arm abutment. The yoke arms have elongated slots formed in them. Bolts having at least partially squared shafts, for attaching the motor to the plate, aid in limiting rotation of the motor after installation. The transmission has a corresponding shaft having a drive pulley mounted to it. The motor shaft has a drive pulley on it. The pulleys have a belt extending between them, on the opposite side of the mounting plate from the transmission and motor arrangement. The mounting system maintains the pulleys in planar relation to maximize power transfer and minimize belt wear. The structure attachment eliminates the need for more than a two point attachment with corresponding savings of material and assembly cost otherwise necessary with other prior art constructions.

5 Claims, 2 Drawing Sheets

ELECTRIC MOTOR MOUNTING ASSEMBLY

BACKGROUND OF THE INVENTION

This invention relates to a dynamoelectric mounting assembly, and in particular, to a mounting assembly for an electric motor used in washing machine applications. While the invention is described in detail with respect to such applications, those skilled in the art will recognize the wider applicability of the inventive principles disclosed hereafter.

There are a multitude of ways known in the art for mounting electric motors in washing machines. In such applications, the motors are typically mounted relative to a power transmission assembly which transmits the power supplied by the motor to an agitator within a tub lying above the motor and transmission assembly. The transmission also supplies power conveyed by the motor to an interior perforated tub which holds the cloths so that when the perforated tub in spun by the transmission, liquid is removed from the clothes by centrifugal force. The many varieties of motor mountings used to position a motor relative to the transmission are typically adaptations for specific applications. If there is a typical motor mounting bracket, on might find that the bracket is symmetrical about the motor and that four mounting bolts are used to secure the motor to the machine support structure. Because of the variety of mounting approaches, there is, however, little uniformity or consistency in the design or functional arrangement in the brackets used to mount the motors relative to the transmissions. Generally, those prior art arrangements require a relatively large number of parts with corresponding complicated construction.

Today, product producibility is extremely important in keeping costs low. The motor mounting assembly in a washing machine is the type of item that can and should be as simple, producible, and low cost as possible. Manufacturers in general have adopted a world market approach to products. Such products, if they are to be successful must be designed so that they are simple to manufacture, easy to use, inexpensive to operate and highly reliable. In areas where these machines expect to be sold, the expectation and necessity for easily available maintenance and servicing capability cannot be underestimated. Thus, it is important that a simple means of mounting a motor relative to a power converting transmission for a washing machine be provided. With regard to the technical aspects of mounting the motor relative to the transmission, it is critical that the shaft mounted pulley on the motor be kept in a coplanar alignment with the shaft mounted pulley on the transmission assembly. If this relationship does not remain coplanar, the belt will ride off of the pulleys and power will not be transmitted from the motor to the transmission. If the alignment is off just slightly, the belt may remain on the pulleys, but the belt will be subject to undesirable wear and will ultimately break before reasonable life expectancy. The results of any of these conditions will, of course, require that either the user, or someone who can service the unit, be able to replace the belt. Even when belt wear is not a problem, other repair or maintenance operations may require removal of the motor and belt, for example. Again the service person must be able to make the necessary adjustments to assure the alignment is restored appropriately for normal operation of the washing machine.

Given all of these concerns, it is an object of the present invention to provide a motor mounting assembly that will maintain the planar alignment between the pulley on the motor and the pulley on the transmission unit so that a belt between the two pulleys can be maintained in the plane of the pulleys to assure normal operation of the washing machine and normal life expectancy of the belt. It is yet another object of the present invention to provide a motor mounting assembly that is simple in design and strong enough to provide the necessary support for a motor mounted to a mounting plate, which supports in common, both the motor and the transmission with which it is associated. It is another object of the present invention to provide a motor mounting assembly that requires as few parts as possible. It is yet another object of the invention to simplify and minimize the fasteners required to secure the motor to the mounting plate which it shares with the tub and agitator transmission assembly. It is another object of the present invention to provide a mounting assembly requiring less mounting plate support material. And finally it is an object of the present invention to leverage the operating elements associated with the mounting bracket assembly to permit fewer fastening devices to be used. These and other features, objects and advantages of the present invention will be apparent to those skilled in the art in the course of reviewing the drawings and disclosures which follow.

SUMMARY OF THE INVENTION

In accordance with this invention, generally stated, a two point motor mounting assembly for attaching an electric motor to a mounting plate relative to a washing machine transmission, also mounted to that plate, is provided, which employs mounting ears extending outwardly from the front endshield of the motor. The combination of mounting ears which are an integral part of an endshield of the motor, and specifically the front endshield through which the motor shaft extends, associated with a mounting plate configured with an open ended yoke on one end to embrace the motor and an adjoining circular opening to accommodate the rotating shaft of the washing machine transmission, both shafts pointing downwardly through the mounting pla te, provides the mounting arrangement for accomplishing the objects of the present invention. The yoke has yoke arms, which in the preferred embodiment partially encircle the motor, and also have respective parallel closed ended slots formed in them to position the motor. These slots are aligned with square holes in each of the mounting ears of the front endshield of the motor so that when a bolt is keyed into the square hole in each of the mounting ears, and a bolt threaded end is extended into and through the slot in each of the yoke arms, the motor can be moved, within the limitations of the yoke arm slots, away from the transmission to apply tension to the belt between the pulley on the motor and the pulley on the transmission. Thereafter, when the bolt is tightened down by means of a washer and nut being placed on its threaded end, the belt tension is set and the motor position is fixed. The two bolts, one in each of the mounting ears, are on a line apart from each other but normal to a line between the shaft of the transmission and the shaft of the motor. The motor mounting ears are fixed upon the top surface of the mounting plate, with the motor supported within the yoke upon the top surface of the mounting plate, and with the tension force upon the belt between the two pulleys below the surface of the mounting plate. In this arrangement, the motor is caused to be pressed against the free end extremities of the yoke arms while simultaneously being fixed to the mounting plate by the bolts. Thus, the combination of the two bolts on one side of the motor shaft and the tension force applied to the pulley from the far side of the motor shaft causes the motor to be fixed securely against the top surface of the mounting plate. In the preferred embodiment, the mounting ears are integrally constructed with the front endshield of the motor. A stiffener preferably is added to the underside of each of the mounting ears to increase their structural strength. Since the mounting ears are reduced in size dimensionally and the additional set of bolts that would normally be required in a typical installation have been eliminated, the length of the yoke arms of the mounting plate is reduced, with with an additional result in savings in material cost.

In summary, the combination of shortened yoke arms for a mounting plate which supports a motor by means of mounting ears, which are part of the front motor endshield and which rest upon the top surface of the yoke arms, so as to be secured thereto by means of bolts passing through the mounting ears from above and the yoke arms from below, at two points, provided support for the motor upon the mounting plate in order to securely hold the motor in place.

BRIEF DESCRIPTION OF THE DRAWINGS

Referring now to the drawings which disclose the preferred embodiment of the present invention.

DESCRIPTION OF THE PREFERRED EMBODIMENT

Figure 1:
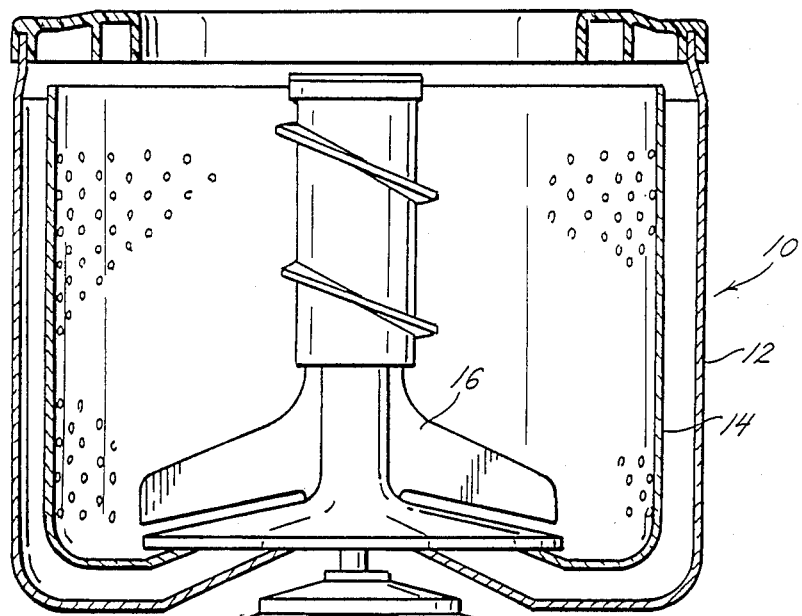
FIG. 1 is a sectional view, partly broken away, of a washing machine employing the present invention and illustrating its system installation.

Referring now to the FIG. 1, a washing machine 10 is shown with an outer washtub 12 and the inner perforated wash tub 14 contained within the outer tub 12. During the filling cycle of the machine operation, the combined washtub 12 and inner perforated tub 14 are filled with water. During the wash cycle, when the agitator 16 is churning the water within the two tub combination, water fills both the inner and outer tubs. During the spincycle* of the machine, the perforated tub 14 is spun so that the water in the clothes is forced out of them and through the perforations to the outer washtub 12 and then out of the machine in a conventional way. Underlying the tubs 12 and 14 is a transmission 18 and a mounting plate 20 to which the transmission 18 is attached by means of a plurality of supports 22. These supports 22 include a plurality of bolts 23 for connecting the plate 20 to the overall washing machine structure. Mounted along side the transmission 18 on the mounting plate 20 is a motor 28 which is supported upon the mounting plate 20 by means of a pair of mounting ears 32. The ears 32 are attached to the mounting plate 20 through bolts 30 and attached nuts 31. Other means of attachment may be employed, if desired. As can be seen in FIG. 1, a shaft 42 of the motor, having a pulley 44 attached to it, is connected by means of a belt 46 to a pulley 26 on a shaft 24 of the transmission 18. Various electrical and structural details of the motor 26 are contained in copending applications Ser. No. 227,146 by Barker, filed Aug. 2, 1988, Ser. No. 227,147, filed Aug. 2, 1988 by Barker et al, Ser. No. 227,177, filed Aug. 2, 1988 by Lewis et al, and Ser. No. 227,164, filed Aug. 22, 1988 by myself, the disclosures of which are intended to be incorporated herein by reference.

Figure 2:
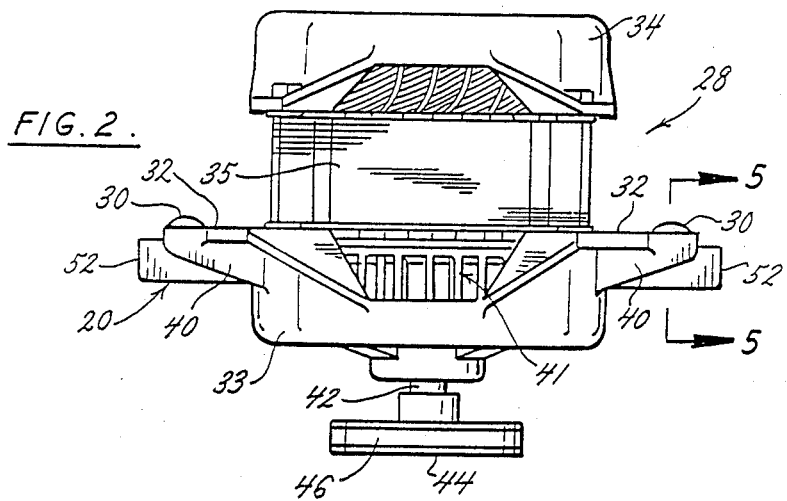
FIG. 2 is a side view of one illustrative embodiment of a motor employed with the present invention.

To achieve a better understanding of the configuration of the motor 28 itself, with reference to FIGS. 1 and 2, it can be seen that the motor 28 includes of a front endshield 33, a rear end shield 34, with a rotor assembly 39 and stator assembly 35 lying in between. As shown in FIG. 2, a fan 41 is located within the front endshield 33. It also should be noted, in FIG. 2, that the shaft or shaft extension 42 of the motor exits the front endshield 33. As seen with reference to FIG. 1 it is obvious that shaft 42 is in a vertical position facing downward, and the pulley 44 is attached to the shaft extension 42 after it exits front endshield 33.

Figure 3:
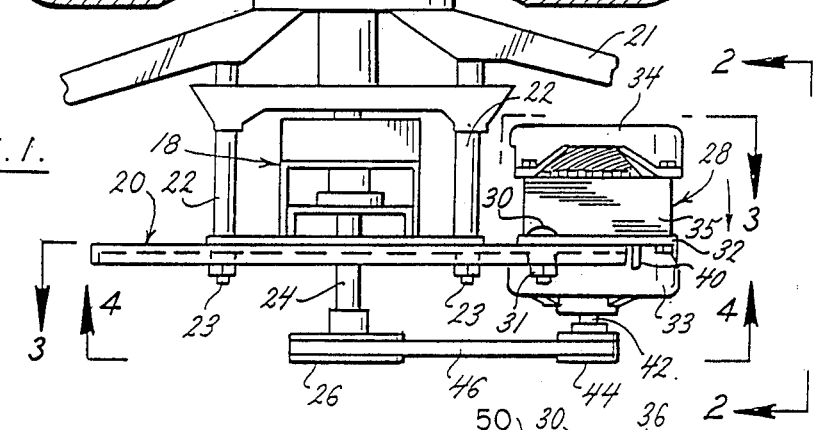
FIG. 3 is a top view of the mounting system shown in FIG. 1, taken along the line 3—3 of FIG. 1.
Figure 3:
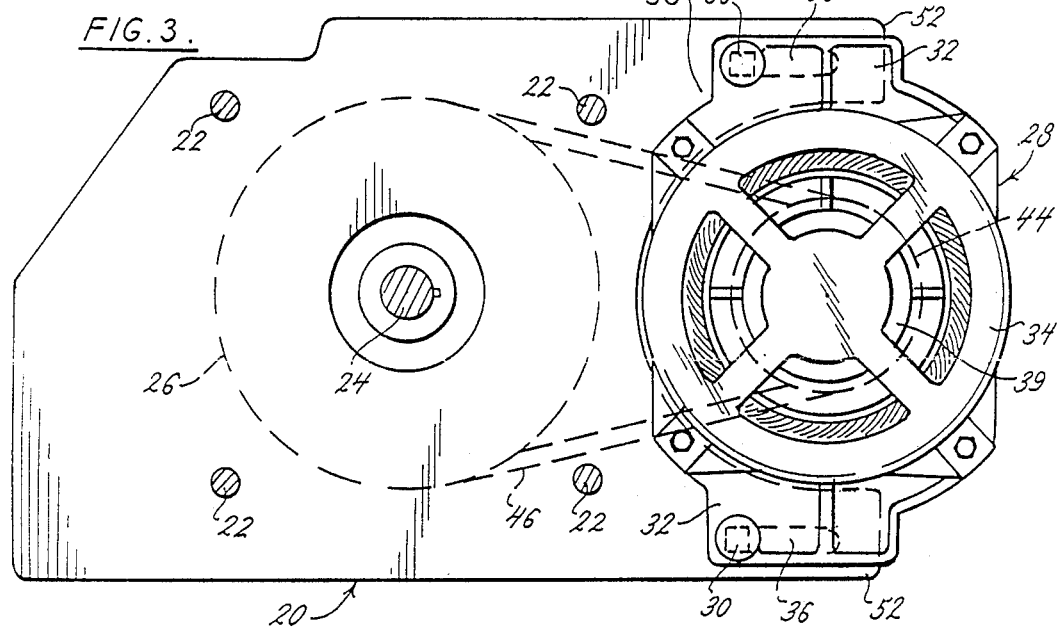

In FIG. 3, looking down from the tub 12 towards the mounting plate 20, the mounting ears 32 can be seen resting upon a yoke 50 have a pair of yoke arms 28. The motor 52 is thus supported by the yoke 50. The belt 46, which lies below the mounting plate 20, is in tension between the motor 28, pulley 44 and the pulley 26 on the shaft 24 of the transmission 18. As seen in FIG. 1, this arrangement tends to pull the motor 28 so that its mounting ears 32 press against the top surface of the mounting plate 20, and contributes to its being held down on the plate 20. The motor 28 is physically disposed in an open mouth 101 of yoke 50 in the end of the mounting plate 20, opposite the location of the transmission. That is to say, mouth 101 is the opening in the mounting plate 20 created by the yoke arms 52, as shown in FIG. 4.

Figure 4:
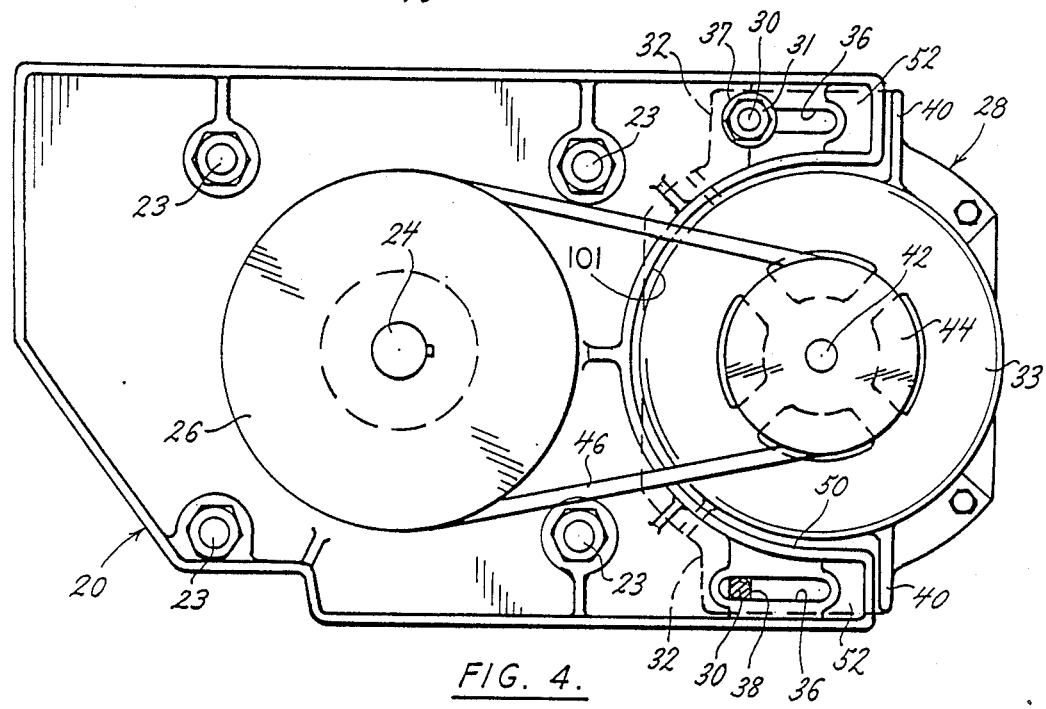
FIG. 4 is a view taken along the line 4—4 in FIG. 1.

FIG. 4 is the reverse view of FIG. 3 which shows that the belt 46 is held in tension between the pulley 44 of the motor 28 and the pulley 26 on the shaft 24 of the transmission 19. Thus the mounting ears 32 are pulled against the extremities of the yoke arms 52 of the mounting plate 20 so that the motor 28 is held against the mounting plate by the effect of the belt pulling on the motor pulley 44 under the mounting plate 20 and the bolts 30 passing through the slots 36 in the mounting plate 20 and being secured by the nuts 31. As can be seen in both FIGS. 3 and 4, the mounting ears 32 preferably have square bolt holes 38 formed in them. The bolt holes 38 are in registration with a part of slots 36 in the yoke arms 52 of the mounting plate 20.

Figure 5:
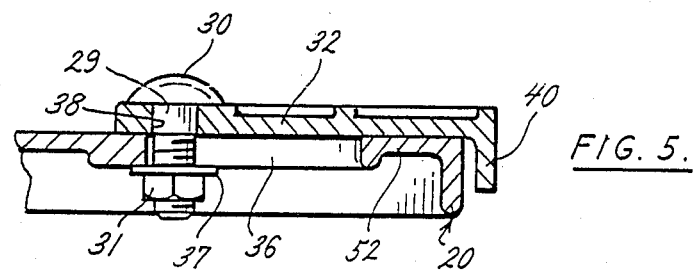
FIG. 5 is a partial sectional view taken along the line 5—5 of FIG. 2.

FIG. 5 more clearly shows, in cross-section, the square hole 38 in the mounting ear 32 and the threaded portion of the bolt 30 passing through the slot 36, a washer 37 and the threaded nut 31 on the underlying side of the mounting plate 20. The slot 36, of course, permits the preselected, adjustable movement of motor 28. That is, movement of the ears 32 and the bolts 30 on each side of the motor 28 along the slots 36 permits a user to set the correct tension on belt 46 between the pulley 44 on the motor 28 and the pulley 26 on the transmission 18. It should be observed, in both FIGS. 4 and 5 that a stiffener 40, normal to the mounting ears 32 and facing downward in the direction of the front endshield 33, as seen in FIG. 4, may be provided on each side of the mounting assembly in order to strengthen the mounting ears 32, thereby enabling the ears 32 to withstand the forces being applied upward against the mounting ears 32 by the yoke arms 52 as a result of the forces being applied to the motor 28 by the effect of the belt 46 pulling on the pulley 44 during the operation of motor 28.

As thus described, the motor mounting assembly of the present invention is a simple structure and method for mounting a motor to a mounting plate, and to maintain alignment between the motor and a transmission of a working machine. The arrangement utilizes only a two point interconnection, enabling the system to use a minimum of material for both the mounting plate supporting the motor and the motor endshield, specifically the mounting ears which are a part of the endshield. Although the system employs only two bolts for mounting the motor, the electric motor is maintained in alignment with the transmission it drives by means of a belt and pulley system. The pulleys are maintained in alignment and a maximum amount of power is thus transmitted through the belt to the pulley on the transmission with a minimum of belt wear. The electric motor mounting assembly uses few parts, requires less material, and takes advantage of the structural relationships between the mounting ears of the motor and the yoke arms on the mounting plate to establish a stable relationship between the motor and the mounting plate and maintain a fixed alignment between the pulley on the motor and the pulley on the transmission. The fixed relationship of the transmission to the mounting plate, and the belt tension between the transmission shaft pulley and the motor shaft pulley beneath the mounting plate, acts on and causes the side of the mounting ears, opposite to the side bolted to the mounting plate, to be held secure against the yoke arms at the top of the mounting plate.

The invention as thus described may be varied to some extent and in some of its aspects by those skilled in the art who have knowledge of the structural dynamics of the present invention and the manner in which the various elements of the present invention can be varied and leveraged without going beyond the scope and spirit of the present invention. For example, the physical design or appearance of the motor, or its components may be varied. While the mounting plate was described as having a yoke for supporting the motor, structures other than yokes may be used. The design of the stiffener may be varied or eliminated in other embodiments of this invention. These variations are merely illustrative.

Having thus described the invention, what is claimed and desired to be secured by Letters Patent is:

1. A two point motor mounting assembly for mounting a motor used in a household appliance within the appliance, the motor being connected to a transmission system comprising:

a mounting plate installed within the appliance and having a yoke-shaped section at one end thereof defining a pair of spaced apart yoke arms between which the motor is received;

an end shield attached to one end of the motor and having a pair of opposed mounting ears extending outwardly from the sides thereof, the spacing between said mounting ears being such that each ear respectively overlays one of the yoke arms when the motor is fitted therebetween, each yoke arm and its overlaying mounting ear having corresponding openings therethrough for attaching the endshield to the mounting plate;

fastening means fitting through each set of openings to mount the motor to the plate; and, stiffening means on the end of each mounting ear, the opening in each ear being at one end of the ear and the stiffening means being at the opposite end thereof, said stiffening means strengthening the mounting ear and enabling it to withstand the forces applied by the yoke arm against the mounting ear to thereby help balance the forces between the motor and the transmission system.

2. The motor mounting assembly of claim 1 wherein each stiffening means is normal to its associated mounting ear and facing in the direction of the end shield.

3. The motor mounting assembly of claim 2 wherein the opening in each of the yoke arms comprises an elongate slot for adjusting the position of the motor.

4. In a household appliance having a motor and a mounting plate on which the motor is installed, the motor being connected to a transmission system, the mounting plate being horizontally installed within the appliance, and the motor being mounted vertically with respect to the plate and having an endshield on the end of the motor adjacent the plate when mounted thereto; the improvement comprising a two point motor mounting assembly wherein the mounting plate has a yoke-shaped section at one end thereof defining a pair of spaced apart yoke arms between which the motor is received, and the end shield has a pair of opposed mounting ears extending outwardly from the sides thereof, the space between said mounting ears being such that each ear respectively overlays one of the yoke arms when the motor is fitted therebetween, each yoke arm and its overlaying mounting ear having corresponding openings therethrough for attaching the end shield to the mounting plate, a bolt fitting through each set of openings to mount the motor to the plate and a nut securing each bolt, and a stiffener integrally formed on an end of each mounting ear, the opening in each ear being at one end thereof and the stiffener being at the opposite end, each said stiffener being normal to the end of its associated mounting ear and facing in the direction of the end shield to thereby help balance the forces between the motor and the transmission system.

5. The improvement of claim 4 wherein the opening in each of the yoke arms comprises an elongate slot for adjusting the position of the motor.

* * * * *

UNITED STATES PATENT AND TRADEMARK OFFICE
CERTIFICATE OF CORRECTION

PATENT NO. : 4,922,151
DATED : May 1, 1990
INVENTOR(S) : John G. Lewis

It is certified that error appears in the above—identified patent and that said Letters Patent is hereby corrected as shown below:

```
Column 1, line 20, is "tub in spun",
  Should be -- tub is spun --;

Column 1, line 26, is "bracket, on might",
  Should be -- bracket, one might --;
```

Signed and Sealed this

Ninth Day of June, 1992

*Attest:*

DOUGLAS B. COMER

*Attesting Officer*   *Acting Commissioner of Patents and Trademarks*